Dec. 26, 1950 J. RAZEK 2,535,232

ELECTRICAL APPARATUS

Filed April 16, 1947 2 Sheets-Sheet 1

Inventor
Joseph Razek
by Robert L Kahn
Attorneys.

Dec. 26, 1950 J. RAZEK 2,535,232
ELECTRICAL APPARATUS
Filed April 16, 1947 2 Sheets-Sheet 2

Inventor
Joseph Razek
by Robert L Kahn
Attorneys

Patented Dec. 26, 1950 2,535,232

UNITED STATES PATENT OFFICE 2,535,232

ELECTRICAL APPARATUS

Joseph Razek, Havertown, Pa., assignor to Robert L. Kahn, trustee, Chicago, Ill.

Application April 16, 1947, Serial No. 741,716

5 Claims. (Cl. 179—1)

This invention relates to an electrical apparatus and particularly to an amplifier system having means for the prevention of oscillation due to feedback from a point in the system to another at a lower energy level. The invention is particularly adapted for use in public address systems and intercommunication systems operating at audio frequencies, although it may be used generally in connection with amplifier systems operating in various frequency bands. This invention, in particular, prevents oscillations in a system including as a part thereof amplifiers where the feedback is from the output of the system to the input thereof.

A public address system including one or more amplifiers and embodying the present invention may have one or more microphones constituting the input of the system in any desired position with respect to one or more speakers constituting the output of the system, and the gain of the amplifiers may have any desired value without danger of oscillations due to acoustic coupling.

The invention, in general, provides a simple means for destroying the normal phase relationship between the output and input of a system containing one or more stages of amplification, such normal phase relationship being necessary for the generation and maintenance of oscillations. In its simplest form, a system embodying the present invention provides frequency multiplication means at any desired place in the communication channel between the input and output of the entire system. While the frequency may be multiplied by any even number, a particularly effective and simple system is obtained by doubling the frequency.

For practical purposes, a system embodying the present invention may have a full-wave rectifier interposed in the communication channel at any desired spot between the input and output of the entire system. While full-wave rectification may result in distortion and some departure from true frequency doubling, nevertheless full-wave rectification is good enough so that satisfactory operation of the system will be provided. It is evident that every positive (or negative, as the case may be) half-cycle of the original speech waves will be out of phase with every alternate wave of the doubled frequency. Feedback from any point of the system beyond the full-wave rectifier (in the direction of speech transmission) to any other point in advance of the full-wave rectifier will not result in oscillations.

The nature of the rectifiers utilized in a system embodying the present invention may vary depending upon the energy level of the portion of the system containing the full-wave rectifier. Thus, rectifiers range from crystals used in radio receivers to handle minute potentials through copper oxide and selenium rectifiers for handling moderate potentials of the order of one or more volts up to vacuum tube types for handling substantial potentials. A public address system, for example, can have a communication channel where voice potentials may be measured in millivolts, volts, or the order of a hundred volts.

It is desirable that any reverse potential passed by the rectifier be negligible in comparison to the speech potentials passed in the forward direction. As an example, a copper oxide rectifier has been successfully used at a place in the communication system of an audio frequency amplifier where the speech potentials were of the order of about one volt. Even though speech potentials of a fraction of a volt are encountered, nevertheless, the reverse potential passed by a copper-oxide type of rectifier is negligible. A germanium-type rectifier may be used with good results at such energy levels.

It is understood, of course, that each rectifier unit of a full-wave rectifier may consist of a series of cascaded rectifiers in the event that the potential to be handled is greater than can be safely handled by one rectifier unit. However, the rectifier art is highly developed and well known so that anyone skilled in the art may readily determine the most desirable and efficient type of rectifier for use at a desired location.

In order that the invention may be fully understood, several embodiments thereof will now be disclosed in connection with the drawings wherein Figure 1 shows, in diagrammatic form, a system embodying the invention.

Figure 1:
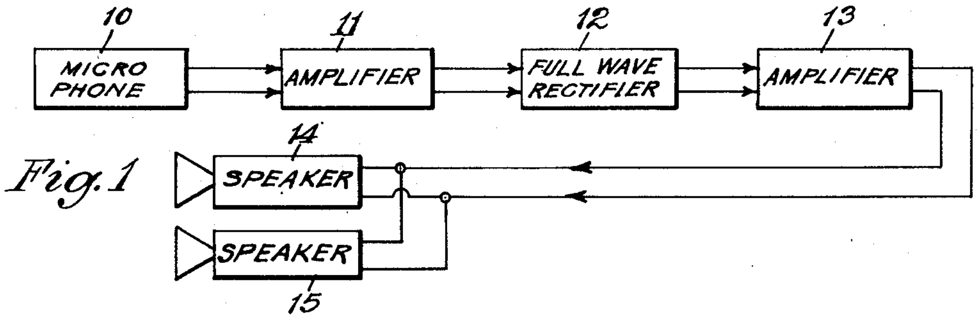

Referring first to Figure 1, 10 indicates a transducer of any type in a public address system or an intercommunication system. Transducer 10 may be any one of a number of different types of microphones or a phonograph pick up. While one transducer is shown, any number may be used. Transducer 10 feeds its output to amplifier 11 which may be considered as a pre-amplifier. Thus, amplifier 11 may simply consist of one or two stages of audio frequency amplification. Amplifier 11 feeds its output to full-wave rectifier 12 of any desired type. Rectifier 12 may be either a simple full-wave rectifier having one cathode and two anodes or one anode and two cathodes or may be a bridge rectifier system or any other of well-known full-wave systems.

Rectifier 12 feeds amplifier 13, this amplifier raising the energy level of the system to a value sufficient for use, as for example in speakers 14 and 15. While two speakers are shown, it is understood that the number may vary. Thus, in an intercommunicating system, one of the speakers may be in close proximity to microphone 10, while one or more additional speakers may be at remote stations. In a public address system, the speakers may be disposed in the usual manner.

Figure 2:
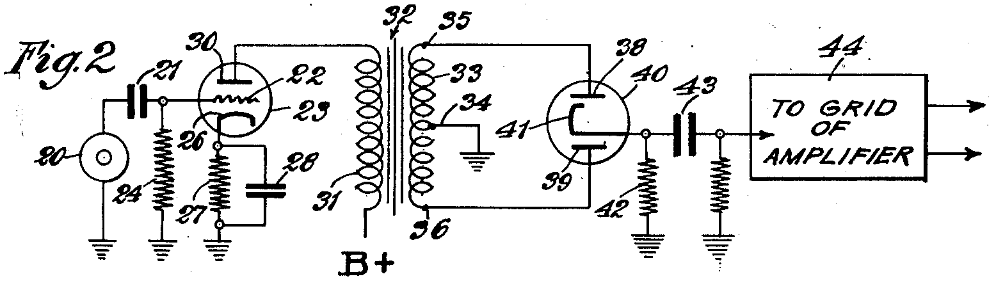
Figure 2 shows, in diagrammatic form, a portion of the system of Figure 1 with transformer coupling to the input of the full-wave rectifier and resistance coupling from the output of the rectifier.

Referring now to Figure 2, there is shown a circuit of a portion of a system which may be used in Figure 1. Microphone 20 is coupled through blocking condenser 21 to control grid 22 of vacuum tube amplifier 23. Control grid 22 is grounded through resistor 24. Amplifier 23 has cathode 26 connected to ground through bias resistor 27 shunted by condenser 28. Tube 23 has anode 30 connected to primary 31 of audio frequency transformer 32. Primary 31 is connected to the usual source of anode supply.

Transformer 32 has secondary 33 provided with center tap 34 and end terminals 35 and 36. Center tap 34 is grounded. Terminals 35 and 36 are connected to electrodes 38 and 39 of a full-wave rectifier 40. In this particular instance, rectifier 40 is shown as of the thermionic type with anodes 38 and 39 and cathode 41. Other types of rectifiers may be used.

Cathode 41 is grounded through load resistor 42 and is also connected through blocking condenser 43 to the input of audio frequency amplifier 44. In this particular instance, the connection may be to the control grid or cathode of a vacuum tube. Amplifier 44 may correspond to amplifier 13 in Figure 1.

Figure 3:
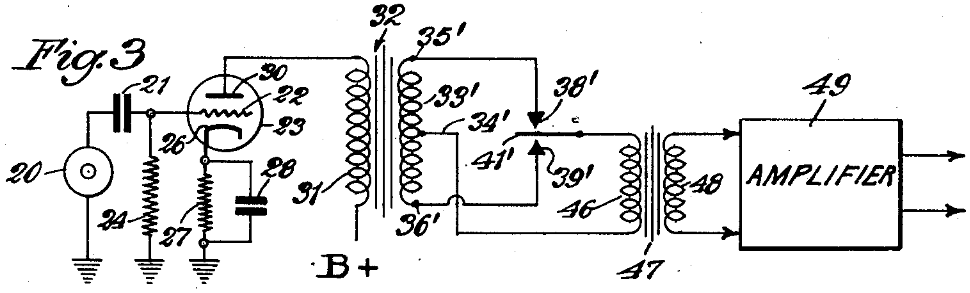
Figure 3 shows a modification of Figure 2 wherein the output of the rectifier has transformer coupling.

Referring to Figure 3, the circuit may be substantially the same as in Figure 2 up to secondary 33′ of transformer 32. In Figure 3, secondary 33′ has terminals 35′ and 36′ connected to electrodes 38′ and 39′ of any suitable full-wave rectifier 40′. Electrodes 38′ and 39′ may be cathodes or anodes, while electrode 41′ will be either an anode or cathode. Electrode 41′ is connected to center tap 34′ of transformer secondary 33′ through primary 46 of audio frequency transformer 47. Transformer 47 has secondary 48 going to the input of amplifier 49. In both Figures 2 and 3, amplifiers 44 and 49 may be omitted and the output fed directly to speakers if the power level is sufficiently high.

Figure 4:
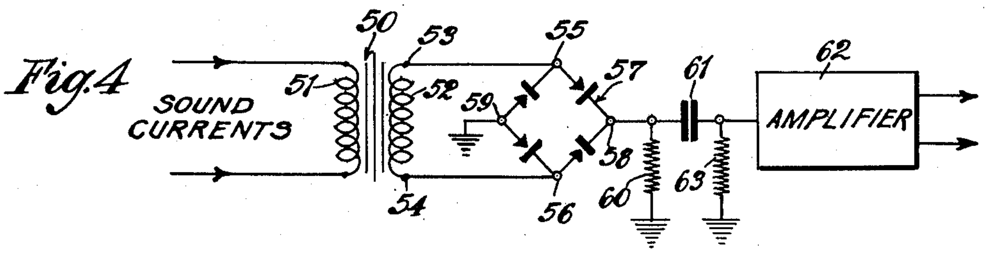
Figure 4 shows a modification of Figure 2 wherein a bridge-type of rectifier is used instead of a simple full-wave rectifier.

Referring now to Figure 4, a modification is shown wherein a bridge rectifier is used instead of a simple full-wave rectifier. Thus, transformer 50 has primary 51 supplied with audio frequency currents. Transformer 50 has secondary 52 whose terminals 53 and 54 are connected respectively to input terminals 55 and 56 of bridge-type rectifier generally indicated by numeral 57. Rectifier 57 has output terminals 58 and 59 completing the bridge. Terminal 58 of the rectifier is connected to ground through load resistor 60, point 59 of the rectifier being grounded so that output terminals 58 and 59 have a complete circuit. Output terminal 58 of the rectifier is connected through blocking condenser 61 to the input of any suitable amplifier 62. Condenser 61 has grounded resistor 63, this resistor together with resistor 60 providing a complete charge and discharge circuit for condenser 61. If blocking condenser 61 goes to the grid of a vacuum tube as is generally customary, resistor 63 would be the customary grid resistor. Condenser 61 may also be connected to the cathode of a vacuum tube utilizing cathode injection, in which case resistor 63 would be the usual bias resistor. It is also possible to use transformer coupling between bridge rectifier 57 and amplifier 62, in which case the primary would be connected across the output terminals of the bridge rectifier while the secondary would be connected to amplifier 62.

It will be noted that, in Figure 2 where blocking condenser 43 is provided and in Figure 4 where blocking condenser 61 is provided, the condensers will not be able to retain a charge for any length of time and, thus, will not be able to block the system. Due to the fact that the currents are pulsating rather than true alternating currents symmetrical about some neutral potential point, it is desirable that the time constant for discharge purposes of the blocking condensers be small enough that there will be little or no tendency for distortion arising out of a possible blocking action due to condenser charging.

Figure 5:
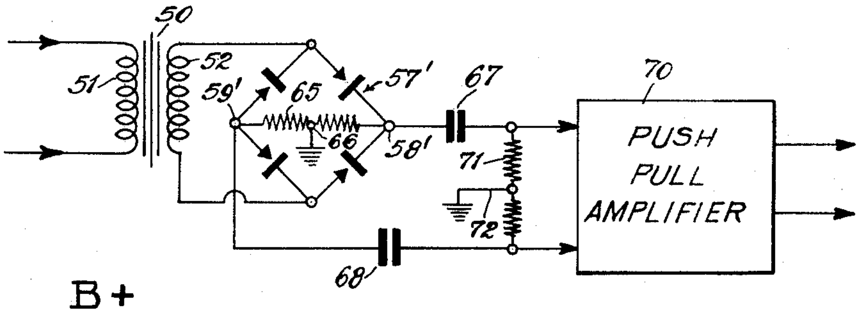
Figure 5 is a modification of Figure 4 wherein the output of the bridge rectifier is coupled through condensers to a push-pull amplifier.

Referring now to Figure 5, a modification of Figure 4 is shown wherein rectifier 57′ has output terminals 58′ and 59′ supplying a push-pull amplifier. In the case of transformer coupling, it is evident that the primary of a conventional transformer may be connected across output terminals 58′ and 59′ while a center-tapped secondary may be provided for the usual push-pull amplifier. However, for condenser coupling, output terminals 58′ and 59′ are connected by resistor 65 having center 66 grounded. Output terminals 58′ and 59′ are connected through blocking condensers 67 and 68 to push-pull amplifier 70. The input to the amplifier is connected by resistor 71 having center 72 grounded. In this circuit, it will be noted that complete charge and discharge circuits for coupling condensers 67 and 68 are provided.

Figure 6:
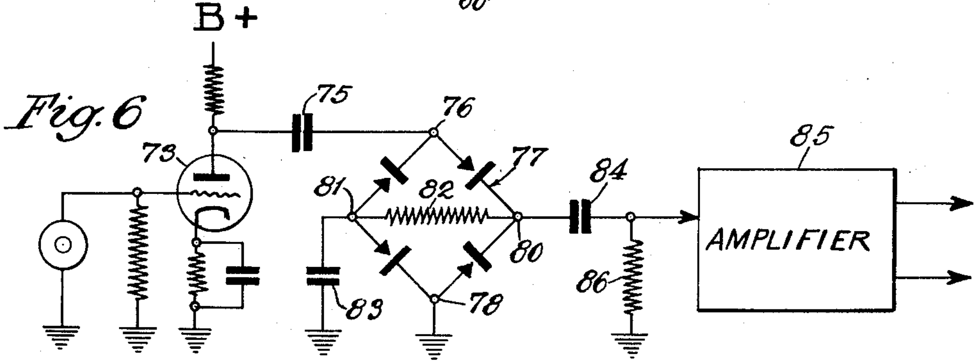
Figure 6 shows, in diagrammatic form, a portion of the system of Figure 1 with condenser coupling between one stage of an amplifier and a bridge-type rectifier.

Referring now to Figure 6, a still further modification is shown wherein pre-amplifier 73, corresponding to amplifier 23 of Figure 2, is connected through blocking condenser 75 to input terminal 76 of bridge rectifier 77. Bridge rectifier 77 has its other input terminal 78 grounded. Rectifier 77 has output terminals 80 and 81 respectively. Output terminals 80 and 81 are connected together by load resistor 82. Output terminal 81 is connected to ground for audio frequencies by blocking condenser 83. Output terminal 80 is connected through blocking condenser 84 to the input of amplifier 85. The input is grounded through resistor 86. It will be noted that condensers 83 and 84 have complete charge and discharge circuits by way of the arms of rectifier system 77.

Figure 7:
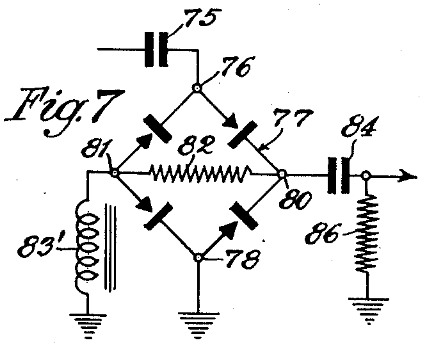
Figure 7 is a modification of the bridge rectifier of Figure 6.

Referring now to Figure 7, a modification of Figure 6 is shown wherein blocking condenser 83 is replaced by choke 83′. It is evident that a series or parallel combination of choke and condenser may be provided between output terminal 81 of bridge rectifier 77 and ground or the other terminal of the input to amplifier 85.

Figure 8:
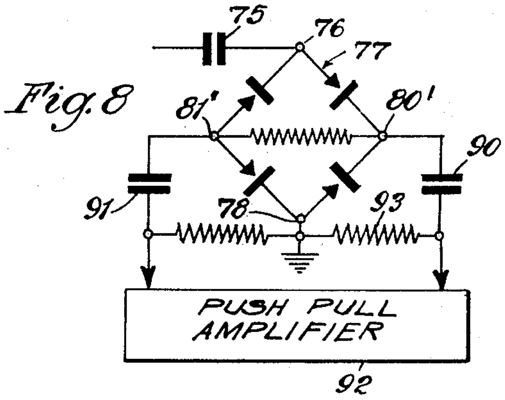
Figure 8 is a still further modification of the bridge rectifier of Figure 6 with the output going to a push-pull amplifier.

Referring now to Figure 8, an additional modification of Figure 6 is shown wherein the bridge rectifier has output terminals 80′ and 81′ connected through blocking condensers 90 and 91 respectively to push-pull amplifier 92. Blocking condensers 90 and 91 have their circuits completed by resistor 93 connected to grounded bridge input terminal 78.

It is evident that various arrangements may be provided for using either a simple full-wave rectifier or a bridge-rectifier system. By the use of blocking condensers, the usual circuit for applying bias to the control grid of a vacuum tube may be used. In some instances, the blocking condensers may be eliminated and reliance had upon the proper polarity of the rectifier for preventing a short-circuiting of a bias potential resistor or source.

Figure 9:
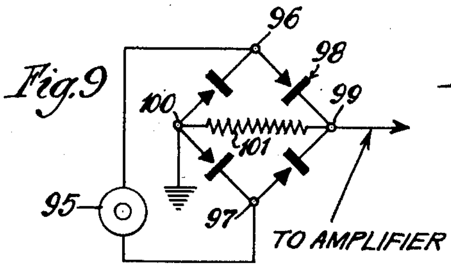
Figure 9 shows a detail of a bridge-type rectifier fed by a microphone.
Figure 10:
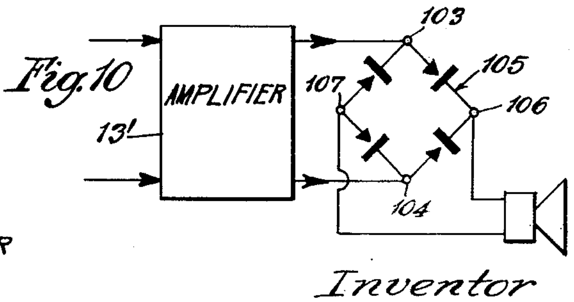
Figure 10 shows a bridge-type rectifier disposed between an amplifier and speaker.

It is, of course, possible to dispose a full-wave rectifier immediately adjacent the input of the entire system, as shown in Figure 9 for example, or immediately adjacent the output of the system, as shown in Figure 10. In Figure 9, microphone 95 feeds input terminals 96 and 97 of bridge rectifier 98. Rectifier 98 has output terminals 99 and 100. Terminal 100 may be grounded, while terminal 99 may go to the input of any suitable amplifier. The output terminals are shown as connected by load resistor 101 to stabilize the system.

Referring to Figure 10, amplifier 13' of Figure 1 feeds input terminals 103 and 104 of bridge rectifier 105. Rectifier 105 has output terminals 106 and 107 connected directly to one or more speakers. If desired, output terminals 106 and 107 may have a resistance network connected across.

It is understood that other modifications utilizing the principles of the invention may be made, depending upon the peculiar circuit requirements of the system without departing from the spirit of the invention.

The invention has been described in connection with a public address system. In the practical application of the invention to a public address system, it will be advantageous to cut off the higher speech frequencies from the input of the rectifier or rectifier system. Thus, in Figure 1, microphone 10 may be of the type which has little response to the higher speech frequencies, say above about 3500 cycles per second. Or amplifier 11 may have the desired characteristics of cutting off higher speech frequencies. Or a low pass filter may be provided between microphone 10 and rectifier 12. The same applies to the remaining figures.

The place for cut-off in the speech frequency range will vary, depending upon the general characteristics of the system and the type of intelligence to be transmitted. For music, the dividing line will depend upon the nature and instrumentation of the music For speech, it has been found that intelligibility at the output of the entire system is impaired if high frequency components are present at the input of the rectifier.

In addition to speech transmission, signals of a low frequency nature may be handled. Thus, a system for amplifying heart sounds may advantageously employ the present invention. Other sounds or signals of a low frequency nature may be similarly handled. The invention may also be used in an alarm system where noise, in general, is to be handled. Thus, microphone 10 of Figure 1 may be near a baby for indicating when the baby is awake.

What is claimed is:

1. In an audio frequency communication channel including at least one stage of amplification, said channel having an audio frequency input and an audio frequency output with the input and output having some unavoidable coupling therebetween tending to cause oscillation and full-wave rectifying means forming part of the communication channel through which all audio frequency energy in the channel passes for substantially doubling the audio frequencies.

2. In an audio frequency communication channel having an input transducer for transforming sound waves into electric currents, amplifying means for said electric currents and an output transducer for converting amplified sound currents into sound waves, said two transducers having some unavoidable acoustic coupling therebetween tending to generate oscillations in the channel and means in said communication channel and operating upon all audio frequency energy in said channel for substantially doubling the audio frequencies at any desired point in the communication channel for preventing oscillation.

3. The channel of claim 6 wherein said means in said communication channel comprises full-wave rectifying means.

4. An audio frequency system comprising at least one transducer to transform sound waves into electric currents, an amplifier having an input supplied by the electric currents from said transducer, said amplifier having an output, at least one output transducer connected to the output of the amplifier for converting electric currents to sound waves, said system having only one audio frequency communication channel between input and output transducers, said input and output transducers having some unavoidable acoustic coupling therebetween tending to impair the stability of the system and full-wave rectifying means in said communication channel operating on all the audio frequency energy in said communication channel to substantially double the frequencies whereby said transducer coupling will not result in generation of oscillations.

5. An audio frequency communication system comprising at least one input transducer to convert sound waves to electric currents, multistage amplifying means for amplifying said audio frequency currents, said amplifying means having an input fed by the electric currents from said input transducer and having an output; at least one output transducer coupled to the output of said amplifying means to transform sound currents to sound waves, said system having only one audio frequency communication channel and full-wave rectifying means in series between two cascaded stages of amplification in said system to operate upon all audio frequency energy in the communication channel, said rectifying means providing substantially doubled audio frequencies whereby acoustic coupling which may be present between the input and output transducers may be tolerated while maintaining the system free from oscillation.

JOSEPH RAZEK.

REFERENCES CITED

The following references are of record in the file of this patent:

UNITED STATES PATENTS

| Number | Name | Date |
|---|---|---|
| 2,200,461 | Varley | May 14, 1940 |
| 2,341,336 | Singer | Feb. 8, 1944 |